Aug. 12, 1969  L. M. PUSTER  3,460,555

PRESSURE REGULATOR CONSTRUCTION

Original Filed Jan. 21, 1965

INVENTOR.
Louis M. Puster

BY

ATTORNEYS

United States Patent Office

3,460,555
Patented Aug. 12, 1969

3,460,555
PRESSURE REGULATOR CONSTRUCTION
Louis M. Puster, Knoxville, Tenn., assignor, by mesne assignments, to Reynolds Metals Company, Richmond, Va., a corporation of Delaware
Application Jan. 21, 1965, Ser. No. 426,992, now Patent No. 3,252,622, dated May 24, 1966, which is a continuation-in-part of application Ser. No. 344,074, Feb. 11, 1964. Divided and this application May 18, 1966, Ser. No. 551,126
The portion of the term of the patent subsequent to May 24, 1983, has been disclaimed
Int. Cl. B67d *1/04, 1/14;* B65d *83/14*
U.S. Cl. 137—12                      6 Claims

ABSTRACT OF THE DISCLOSURE

This application discloses a relatively large low pressure beer dispensing container with a relatively small high pressure $CO_2$ container. The container has a dip tube with a filtering slot at one end and with an expansion valve at the other end. The valve discharges reduced pressure $CO_2$ into a small chamber under control of a diaphragm. The small chamber discharges low pressure $CO_2$ through passages and through a restrictor orifice into a check valve and into the beer container. The restrictor orifice prevents an unsafe volume of discharge of $CO_2$ into the beer container and prevents damage to the expansion valve.

---

This application is a division of my prior co-pending application, Ser. No. 426,992, filed Jan. 21, 1965, now Patent Ser. No. 3,252,622 granted May 24, 1966, for Gas Flow Control For Dispensing Apparatus and the Like, which is a continuation-in-part of my prior application, Ser. No. 344,074, filed Feb. 11, 1964, for Gas Flow Control Dispensing Apparatus and the Like, now abandoned. More particularly this invention relates to high pressure gas reduction regulators to provide for dispensing of carbonated beverages from containers at relatively low optimum dispensing pressure.

In dispensing apparatus, such as in a gas charged liquid container for beer or the like, it is desirable to introduce relatively low pressure charging gas into such container as the beer is gradually dispensed, to maintain the gas charge above the beer continuously at the optimum or proper pressure, such as 12 p.s.i.g., if the liquid or beverage to be dispensed is beer. The $CO_2$ gas, for example, which is introduced may be supplied from a liquid $CO_2$ container which has a pressure of from 500 to 600 p.s.i.g. This high pressure gas is expanded through an automatic gas pressure reducing valve from such high 500 to 600 p.s.i.g. pressure to a relatively low 12 p.s.i.g. pressure for use above the beer in the dispensing container. It has been discovered that a sustained rush of high pressure gas, or liquefied gas, through the automatic valve is very hermful to the valve and also it has been discovered that high pressure flow from the liquid carbon dioxide container is likely to be interrupted at the dip tube inlet by ice crystal formations and foreign matter collecting over the tube inlet, particularly when the inlet is a single round oriffice inlet.

Accordingly an object of this invention is to provide in combination with a low pressure gas flow restricting orifice at the discharge side of an automatic pressure regulating valve to a beverage container, the regulating valve on the inlet side connecting with the outlet of a liquefied gas or gaseous high pressure container; an improved novel dip tube in the high pressure container having an inlet slot serving as a filter to prevent foreign material from reaching the regulating valve and likewise avoid the usual clogging defects of the single round orifice type of dip tube inlet.

While a charging gas, such as $CO_2$ has been described in connection with this invention, many of the features of this invention are applicable to other charging and/or propelling gases.

Other features are apparent from this description, the appended claimed subject matter, and/or the accompanying drawings, in which:

Figure 1:
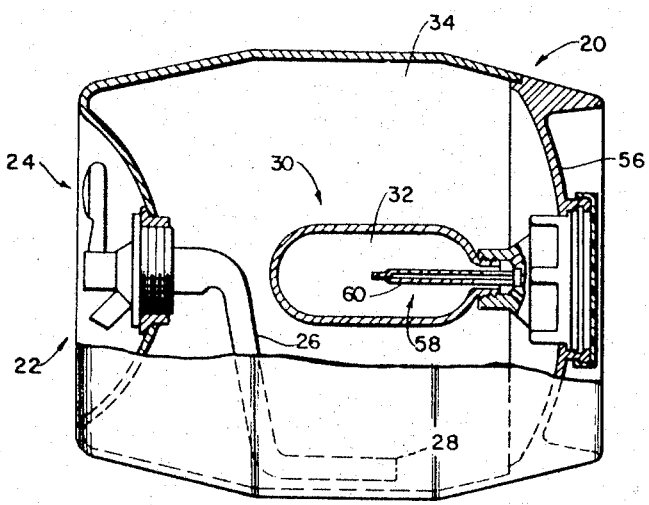
FIGURE 1 is a diagrammatic cross section, partly in elevation, of this invention installed in a beverage container.

Certain words indicating direction, relative position, etc., are used herein for the sake of brevity and clearness of description. However, it is to be understood that these words are used in connection with the specific showing in the drawings. In actual use, the parts so described by these words may have entirely different direction, relative position, etc. Examples of the words so used are "upward," "downward," "vertical," "horizontal," etc.

According to this invention, a low pressure gas charged liquid container 20 may be used, for example, of a size to suitablye hold about 500 cu. inches of liquid or beverage to be dispensed, and may be adapted to be placed in a refrigerator, if it is a beverage to be cooled. The container 20 may be circular in cross section.

A liquid dispensing valve or faucet 22 may be provided, which may be opened and closed from time to time, by a suitable actuating handle 24. The faucet 22 may be connected to a conduit 26, which has its intake 28 near the lowest portion of the container 20.

If the liquid to be dispensed from the container 20 is beer, or other $CO_2$ charged beverage, such beverage may be maintained at a suitable low gas pressure, which may be in the order of 12 p.s.i.g. or any proper pressure required for the particular beverage to be dispensed.

A high pressure propellant or charging gas in a bottle or container 30 may be placed in connection with or in the liquid container 20, so that there is a high pressure propellant gas space 32 inside the container 30, and a low pressure beverage dispensing gas in the liquid space 34 inside the container 20, but outside the container 30.

Automatic low pressure responsive propellant gas expansion means 36 may be provided in a support member 38. The expansion means 36 may have a relatively small, expanded, low pressure, gas chamber 40. A diaphragm 42 may be responsive to the pressure of the expanded low pressure gas in chamber 40. The diaphragm 42 opens a tire inflation and deflation type of valve 44, sometimes known as a "Schrader" valve, which has a stem 46, which opens the valve 44, when the stem is pressed downwardly, and closes the valve when the stem 46 is released. A thrust button 48 is raised and lowered by the diaphragm 42, so that the thrust button 48 pushes the stem 46 down to open the valve 44 when the gas pressure in the chamber 40 is slightly below the desired pressure, preferably such as 12 p.s.i.g. for beer and which releases the stem 46, when the pressure in the chamber 40 is slightly above the selected pressure, such as 12 p.s.i.g. Any suitable type of pressure range adjustment means, may be provided, such as a spring construction 50. This spring is adjustable, and is provided to adjust and regulate the diaphragm 42 to maintain the pressure in the chamber 40 substantially at 12 p.s.i.g., more or less.

The gas bottle or container 30 may be hermetically connected to the support 38 by the threaded construction 52 formed at the neck of the gas bottle and by the resilient ring construction 54. The gas bottle or container 30, and its support 38, may be secured to the end wall 56 of the container 20 in any suitable hermetic manner, as is illustrated by way of example. The support 38 may have a flange 57 which is held against a resilient O-ring 59, by a split ring 61, see FIGURE 2. The split ring 61 may be expanded and contracted when it is desired to insert, or remove, the container 30 and support 38 into or from the container 20.

Figure 2:
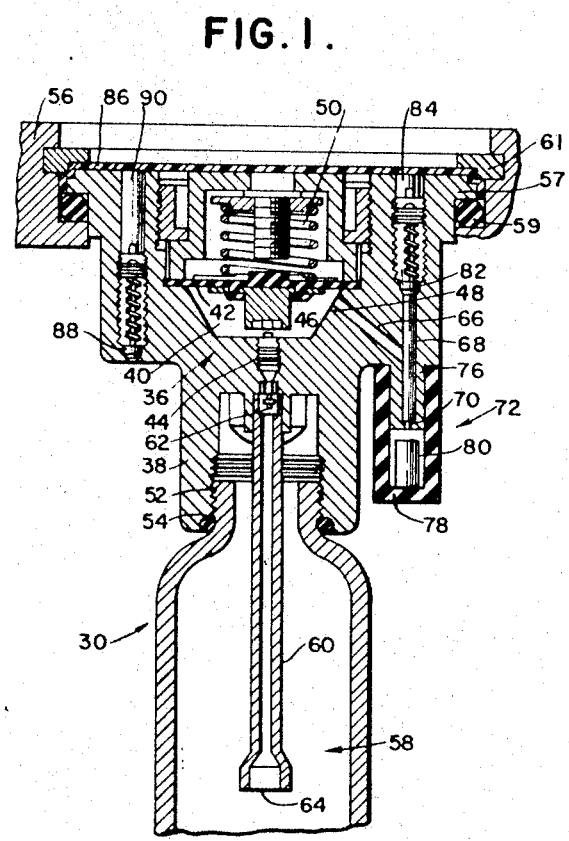
FIGURE 2 is an enlarged cross section of a portion of the embodiment shown in FIGURE 1 showing the dip tube with the filter slot formed in the inlet end thereof.

High pressure propellant gas intake means, see FIGURE 2, may be provided in the propellant gas container 30 and may be connected to the expansion means 36. This intake means may include a suitable dip tube, such as an aluminum tube 60 of aluminum alloy 6061–T6, for example, which may be ¼ inch in external diameter, .035 inch in wall thickness, and 3 inches in length. Its upper end may have counterbore concentrically positioned to enclose the inlet 62 of the tire type valve 44 to gas chamber 40 and its lower end may be provided with a high pressure elongated inlet opening or inlet slot 64. The slot 64 may be made by inserting a stainless steel shim of preferably .003 inch thick (from .002 to .004 inch) with a width of approximately 5/32 inch into the tube 60. The travel length of the slot may be, for example, ⅛ to ¼ inch in length. The lower end of tube 60 may be flattened by press dies, and the shim may then be removed to produce the slot 64. This slot 64, for example, is of a width about equal to the thickness of the shim, of a length equal to about 5/32 inch and of a travel into the tube of about ⅛ to ¼ inch, which slot is thus of a length many times the width thereof.

The container 30 may be so shaped and proportioned that a charge of from 1½ to 2 ounces of liquid may be placed in such container 30, and the level of the liquid $CO_2$, when quiescent, will be below tube tip slot 64 regardless of the position in which the container 30 is placed and particularly when the container is placed in a horizontal position, as shown in FIGURE 1.

The slot 64 serves to prevent foreign material from reaching the regulation valve 44 and also, because of the elongated opening provided by the length thereof, any ice particles over a portion of the slot will not block off the flow of carbon dioxide through the dip tube 60. In fact any foreign material over a part of the slot will tend to be self-clearing during gas generation in the container 30 so that blocking or clogging of the inlet is eliminated.

Figure 3:
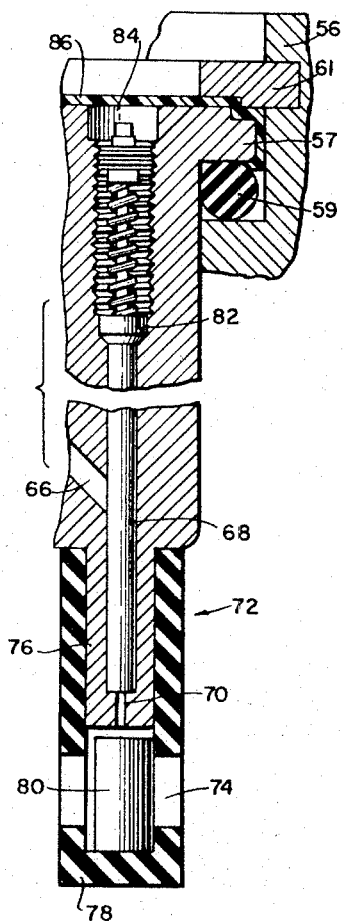
FIGURE 3 is an enlargement of the low pressure restriction orifice portion of FIGURE 2.

However, a sufficient quantity of high pressure gas may at times rush through the valve 44 into the space 34 of the container 20 or into the atmosphere to abrasively harm the valve 44, unless a restrictive or flow control orifice 70, see FIGURE 3 is also used in combination with the inlet slot 64 to limit or prevent such rush of gas through valve 44 and by the provision of the slot possible foreign material is filtered from the propellant before it reaches the valve 44.

A relatively large cross sectional area, but relatively small volume, passageway means 66 and 68 may connect the low pressure gas regulator chamber 40 and the low pressure gas and liquid space 34 in the container 20. For example, the passageway 66 may be in the order of ⅛ inch diameter, and the passageway 68 may be in the order of .092 to .095 inch in diameter.

The restrictive or flow control orifice 70 comprises a relatively small cross sectional area restricting passageway means with respect to the passageway means 68. For example, the cross sectional area of the flow control orifice 70 for beer may be equal to or the equivalent of an area in the order of .015 to .035 inch in diameter, preferably about .028 inch in diameter and the passageway or bore of orifice 70 may be equal to or the equivalent of 1/16 inch in length.

This flow control orifice will permit a flow rate of 14 to 20 standard cu. feet per hour of $CO_2$ when the outlet pressure is zero p.s.i. in the container 20 and 550 p.s.i. in the propellant container 30.

If desired, check valve means 72 may be part of the low pressure propellant gas discharge means. Any type of check valve means may be used. However, for example, a cylindraceous tube may be used, which has two longitudinally extending slits 74, which open when the pressure in the tube 72 is greater than the space outside of the tube and which close when the space outside of the tube is greater than the space inside of the tube. This tube is placed tightly over an extension 76 of the support 38. The tube 72 has a closed bottom 78. A solid cylindrical member 80, which may be made of a suitable aluminum alloy, if desired, is placed in the tube 72, before the tube is attached to the extension 76, so that the member 80 will prevent the tube 72 from collapsing inwardly when excessive pressure is placed upon the outside of the tube 72.

Other valve constructions may be placed in the support 38, which do not directly concern the present invention. For example, a pop-off valve 82 may be placed in the end of the passageway 68 so that the valve will pop off whenever the pressure in the space 40 becomes excessive, for example, from 80 p.s.i.g. to 140 p.s.i.g. When such pressure does become excessive, the pop-off valve 82 may open and will alow gas to enter the space 84 and burst a thin plastic cover 86, to allow escape of the excessively high pressure gas to the atmosphere. Another pop-off valve 88 may be provided, which will open when the pressure in the space 34 becomes excessive. When the valve 88 opens, the excessive pressure gas may escape through the passageway 90 and will burst the thin plastic cover 86 to allow escape of the gas to the atmosphere. Other valves may be added to the support 36, such as a gas charging valve and passageway to charge the container 30 with liquid $CO_2$, which valve is not illustrated, since it does not directly concern this invention. Also, if desired, a rupture disc, not shown, may be provided with passageway means, so that if the pressure in the container 30 becomes excessive, for example, from 2000 p.s.i.g. to 3000 p.s.i.g., the rupture disc will rupture and allow the escape of gas through a passageway somewhat similar to 90 or 84, and will also rupture the cover 86, when the disc also becomes ruptured. The rupture disc is not illustrated, since it does not directly concern this invention.

However, the expanded gas space 40 and the connected passageways 66, 68 and the like, have a relatively small volume which is quickly filled by expanded gas from the valve without any harmful sustained rush of high pressure gas through the valve 44.

Figure 4:
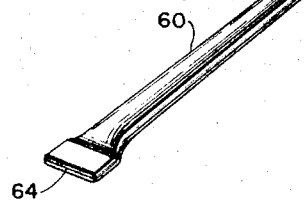
FIGURE 4 is an enlarged perspective view of the present novel dip tube showing the intake end of the tube formed with a slit or elongated slot for filtering gas flow from the $CO_2$ container or bottle disclosed in FIGURES 1 and 2.

The passageway 70 performs a restricting action which is an important feature of this invention. This orifice 70 is capable of regulating the maximum rate of flow of $CO_2$ all the way from the high pressure $CO_2$ inlet slot 64 in FIGURE 4, into the low pressure beverage space 34 in an effective manner to prevent harmful abrasive action in valve 44. This orifice 70 ordinarily receives $CO_2$ in gaseous form only, and at a pressure of 12 p.s.i.g., more or less, on the upstream side of the orifice 70 and at a pressure of from atmospheric pressure to 12 p.s.i.g. on its downstream side. The downstream pressure is atmospheric, for example, when the beverage container 20, which beverage may be beer or ale, is initially being charged with gas, starting with atmospheric pressure, and the pressure may then gradually increase to substantially 12 p.s.i.g. when the container beverage space 34 is charged to the desired 12 p.s.i.g. pressure.

When the container 20 is to be charged at a brewery with beer, the $CO_2$ container or bottle 30, and the support 38, are withdrawn from the beer container 20. The container 20 is then thoroughly cleaned and then is placed in a vertical position, with the faucet end downward on a suitable support or the like. The desired amount of beer is then introduced at atmospheric pressure into the space 34 through the opening which has been left open by the withdrawal of the container 30 and support 38 from the container 20. Thereafter, a thoroughly cleaned or purged container 30 and support 38 are placed in the liquid container 20 and are sealed thereto by the sealing means which are shown in FIGURE 2. The gas bottle or container 30 is then charged with liquid $CO_2$ through a liquid charging valve, not shown, which is accessible through a passageway similar to 90, for example, and which has a connecting passageway from the charging valve to the interior of the container 30.

If the liquid $CO_2$ were first introduced into the purged container 30, without the use of orifice 70 a violent rush of $CO^2$ would be produced through the tire type valve 44 when it is opened into the expansion chamber 40, through the passageways 66 and 68 and into the relatively large beer space 34 at a harmful rate and an abrasive rate of speed through the valve 44. However, such harmful rush of gas is prevented by the action of the restrictive passageway 70 which becomes effective almost immediately because of its highly restrictive character, whereby only a very small amount of $CO_2$ can rush through the valve 44 into the relatively small space 40 and into the relatively small volume passageways 66 and 68 and any other relatively small volume passageways that may be connected to the gas chamber 40.

Since the passageway 70 provides a very restrictive action, the pressure in chamber 40 and passageways 66 and 68, quickly reaches 12 p.s.i.g., and then the diaphragm 40 is pushed upward, see FIGURE 2, and the stem 46 is released to close the valve 62, and to stop any further rush of $CO_2$ which might occur. A continuous unchecked rush of $CO_2$ through the open valve 44, which would be produced by a continued flow of gas to the relatively large beer space 34 and if unchecked by the orifice or passage 70, would be harmful to the valve 44. This is so, because the flow of $CO_2$ from a liquid $CO_2$ source is very abrasive and uncontrollable. However, as has just been described, the orifice or passage 70 insures that a quick rise in pressure in the small volume chamber 40 and passageways 66 and 68, will take place up to the selected pressure, such as 12 p.s.i.g., and therafter only a slow and restricted flow of gas through the orifice 70 is maintained, until all of the contents of the beer container 20 gradually reach 12 p.s.i.g., the equilibrium or fully charged condition. Thereafter, when beer is withdrawn through the faucet 22 from time to time, the orifice 70 allows the diaphragm 42 and the tire type valve 44 to supply $CO_2$ into the space 34, but never at any excessive rate of flow that might be harmful to the valve 44.

Hence, because of restrictive orifice 70, a restrictive action is placed upon the operation of the valve 44 and diaphragm 42, which prevents high speed, excessive gas flow in a continuous manner through the valve 44 at all times, even when the container 20 is being charged with beer and $CO_2$, or when excessive withdrawals of beer are being made at the faucet 22.

The orifice or passage 70 is also effective to prevent harmful and high speed discharge of $CO_2$ from the gas bottle container 30 into the atmosphere, when the container 30 and support 38 are withdrawn from the container 20, in preparation for recharging of the container 20 with fresh beer.

Thus the novel dip tube 60 with a slot inlet opening 64 in place of a round pin hole form of orifice prevents cut-off of gas flow into the inlet of the tube by foreign matter which sometimes blocks a round pin hole type of dip tube gas inlet orifice. Also, $CO_2$ ice particles often develop at the orifice on the inlet end of the tube and such ice particles block a single round orifice, thereby causing an objectionable erratic emission of gaseous $CO_2$ propellant to the regulator chamber 40.

Without further description it is believed that the advantage of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

While the form of the invention now preferred has been disclosed as required by the statutes, other forms may be used, all coming within the scope of the claims which follow.

What is claimed is:

1. A method of controlling the reduction in pressure and flow of $CO_2$ from a liquid $CO_2$ relatively high pressure propellant container having a normal $CO_2$ pressure of from 500 to 600 pounds per square inch into a relatively large volume relatively low pressure space having atmospheric pressure which comprises passing said $CO_2$ from said high pressure propellant container through a relatively large flow automatic pressure responsive means into a relatively small volume capacity intermediate chamber means, and restricting the flow from such intermediate chamber means to said large volume low pressure space by a relatively highly restrictive flow passageway sufficiently restrictive to quickly maintain such intermediate chamber means at substantially 12 pounds per square inch more or less while restrictively feeding such expanded $CO_2$ from said intermediate chamber means into said relatively low pressure space.

2. A method according to claim 1 in which said high pressure $CO_2$ container is a relatively small volume container and said low pressure space is a relatively large volume and relatively low pressure $CO_2$ charged beverage dispensing container having initial atmospheric pressure, and in which the flow from said intermediate chamber means to said large volume low pressure dispensing container is restricted by a relatively highly restrictive flow passageway sufficiently restrictive to quickly maintain such intermediate chamber means at substantially 12 pounds per square inch, more or less, while restrictively feeding such expanded $CO_2$ from said intermediate chamber means into said large volume dispensing container until said dispensing container reaches a pressure substantially of 12 pounds per square inch, more or less.

3. A method according to claim 2 in which the flow of $CO_2$ through said pressure responsive expansion means is then automatically reduced when the pressure in said intermediate chamber means reaches substantially 12 pounds per square inch to maintain such pressure in said intermediate chamber at substantially 12 pounds per square inch.

4. In combination: a liquid $CO_2$ relatively low volume relatively high pressure propellant container having a normal $CO_2$ pressure of from 500 to 600 pounds per square inch; a relatively large volume relatively low pressure $CO_2$ charged beverage dispensing container adapted to have an initial atmospheric pressure; a relatively small volume capacity intermediate chamber means; relatively large flow capacity automatic pressure responsive expansion means connected to pass a relatively large volume of $CO_2$ from said high pressure container into said intermediate chamber means; a relatively highly restrictive flow passageway means connecting said intermediate chamber and said low pressure dispensing container and being sufficiently restrictive to quickly maintain said intermediate chamber means at substantially 12 pounds per square inch, more or less, while restrictively feeding such expanded $CO_2$ from said intermediate chamber means into said large volume dispensing container until said dispensing container reaches a pressure substantially of 12 pounds per square inch, more or less.

5. A combination according to claim 4 in which said pressure responsive means automatically reduces the flow of $CO_2$ when the pressure in said intermediate chamber means reaches substantially 12 pounds per square inch to maintain such pressure in said intermediate chamber at substantially 12 pounds per square inch.

6. A combination according to claim 5 in which a resilient material check valve surrounds said restrictive flow passageway means.

References Cited
UNITED STATES PATENTS 3,252,622  5/1966  Puster _____ 222—399 X ALAN COHAN, Primary Examiner U.S. Cl. X.R.
137—12, 209; 222—396, 399